United States Patent [19]
Sekiguchi et al.

[11] Patent Number: 5,291,594
[45] Date of Patent: Mar. 1, 1994

[54] COMMIT PROCESSING SYSTEM WHICH PROVIDES A LIST OF SITES TO EACH SITE TO ALLOW FOR DIRECT COMMUNICATION BETWEEN PARTICIPATION SITES AND THE TRANSACTION GENERATION SITE

[75] Inventors: Koichi Sekiguchi; Nobuhiro Kato; Yojiro Morimoto; Miho Muranaga, all of Kanagawa, Japan

[73] Assignee: Kabushiki Kaisha Toshiba, Tokyo, Japan

[21] Appl. No.: 698,115

[22] Filed: May 10, 1991

[30] Foreign Application Priority Data

May 10, 1990 [JP] Japan .................................. 2-118554

[51] Int. Cl.⁵ ............................................... G06F 9/00
[52] U.S. Cl. .................................... 395/600; 364/282.4; 364/284; 364/282.1; 364/DIG. 1
[58] Field of Search ......................... 395/600, 575, 200

[56] References Cited

U.S. PATENT DOCUMENTS 5,065,311 11/1991 Masai et al. ........................ 395/575

OTHER PUBLICATIONS

A Distributed Commit Protocol for a Multicomputer System by Ancilotti et al., IEEE May, 1990.
Distributed Databases, Principles and Systems, Chapter 7, Sections 2.4–2.5, "The 2-Phase-Commitment Protocol," Stefano Ceri et al., 1984.

Primary Examiner—Thomas C. Lee
Assistant Examiner—Jennifer M. Orzech
Attorney, Agent, or Firm—Finnegan, Henderson Farabow, Garrett & Dunner

[57] ABSTRACT

A distributed database system comprises a plurality of sites having a computer and a database, and interconnected by communication lines. In each computer, a transaction execution section executes data processing of transaction by accessing the database, according to a transaction generated by a transaction generation section or a transaction sent by another site. A list creation section creates a list of the sites which participate in the transaction generated by the transaction generation section, and sends the list to all other sites participating in the transaction. A commit preparation process section prepares the commit processing of the transaction when the transaction execution section has finished executing the data processing of the transaction and sends a commit preparation completion message to all participation sites. A commit process section executes commit processing of the transaction when it has received the commit preparation completion message from all participation sites within a predetermined period after sending the commit preparation completion message to them.

9 Claims, 7 Drawing Sheets

Fig.7

COMMIT PROCESSING SYSTEM WHICH PROVIDES A LIST OF SITES TO EACH SITE TO ALLOW FOR DIRECT COMMUNICATION BETWEEN PARTICIPATION SITES AND THE TRANSACTION GENERATION SITE

BACKGROUND OF THE INVENTION

1. Field of the Invention

The present invention relates to a distributed database system for more rapidly executing transactions, especially commit preparation processing and commit processing of transactions.

2. Background of the Invention

A distributed database system comprises a plurality of computers, each of which has a database. The plurality of computers are interconnected by communication lines. Each computer managers its own database (computer and its associated database are herein referred to as "site" herein). When a site is supplied with a data processing request through an input device, firstly a computer in the site checks which database includes the necessary data for the requested processing, by referring to a table of stored data names and corresponding locations. If the data is included in the site's own database, the computer reads the data from this database, executes the data processing and writes the data processing result into this database (a series of these processes is called a "transaction"). If the data is included in a database of another site, the computer sends the processing request to the other site, the database of which includes the data. Then the computer of the other site reads the data from its database, executes the data processing at the other site and writes the data processing result to its database, according to the processing request. In this case, if a site is supplied with a data processing request, which requires the processing of both data in the site's own database and data in a database of another site, these sites must maintain consistent data in their respective databases. In short, it is necessary for the data processing to update the data consistently in both databases, and not to update the data in only one database without a corresponding change in the other database. Accordingly, in the prior art, sites of a distributed database system must execute commit processing after any required data processing. Commit processing as used herein means that a site, which was supplied with a data processing request through an input device, becomes a coordinator (supervisor) and another site, which participates in the data processing, becomes a participant. It is necessary for the coordinator and participant to communicate with each other from the end of data processing (called the processing end) to the end of the writing of the data processing result to the database (called the transaction end), to maintain consistent data in the databases.

Figure 1:
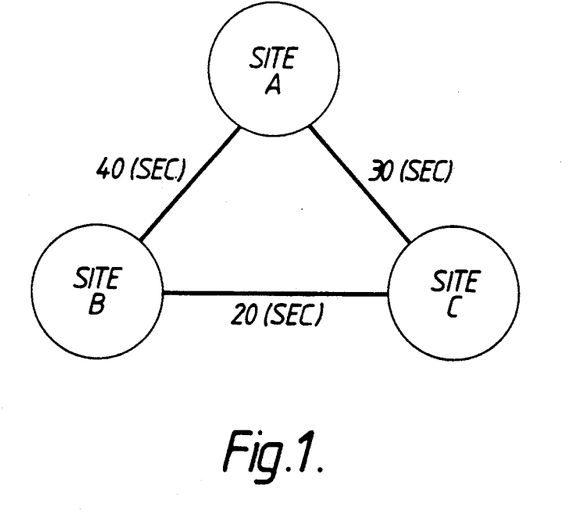
FIG. 1 is a schematic diagram of a distributed database system.
Figure 2:
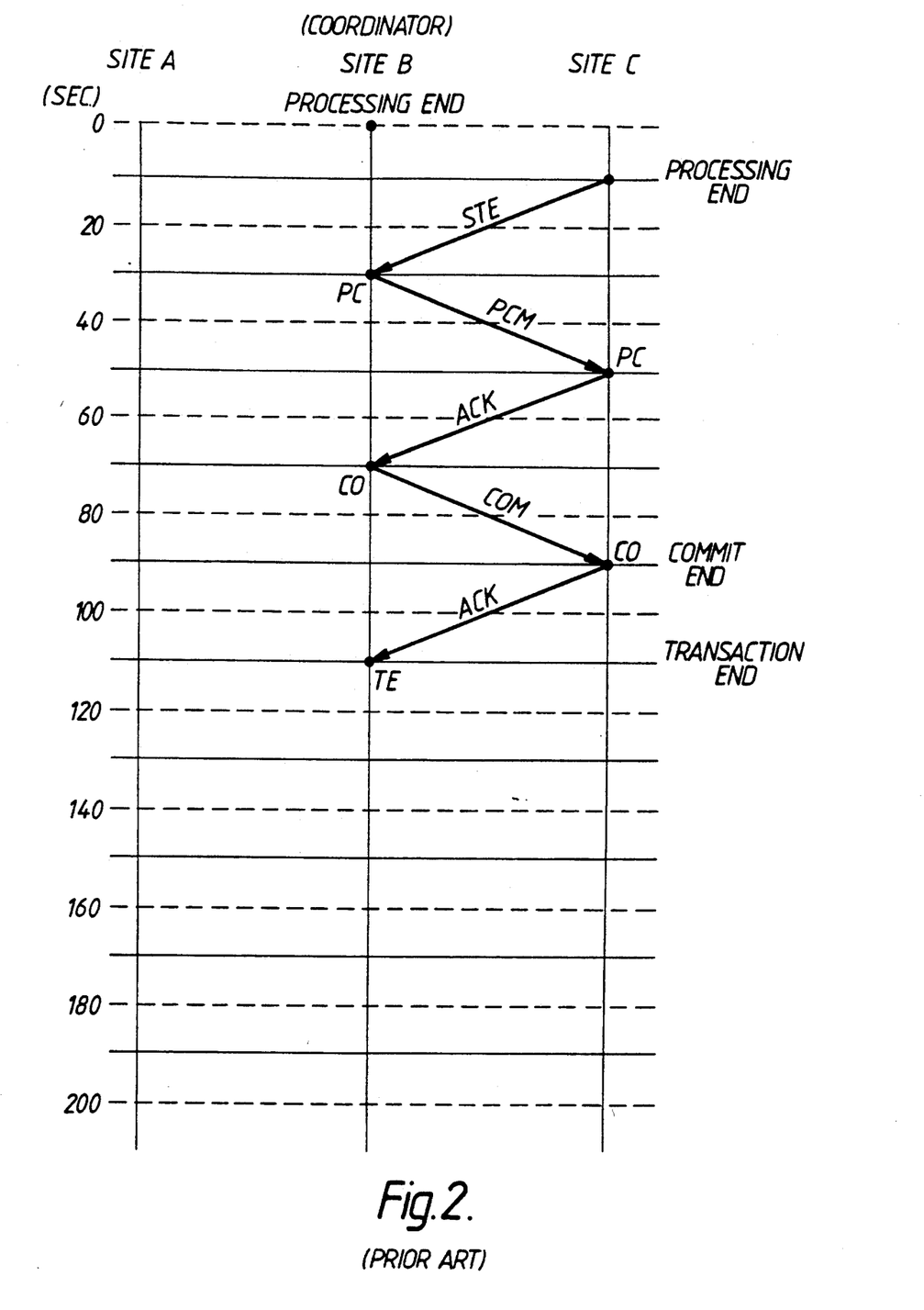
FIG. 2 is a time table of commit processing according to the prior art.

FIG. 1 shows a construction of a distributed database system. This system has three sites A, B and C. Also shown in FIG. 1 is the time necessary for each communication line to send a message between each two sites. FIG. 2 shows a time table of a typical commit processing according to the prior art. It is assumed that a data processing request is supplied to site B and the data processing requires updating of data in both database B of site B and database C of site C. For example, Mr. X goes to the New York branch (site B) of American Bank. Mr. X wants to remit money from his account in the New York branch to Mr. Y's account in the Washington branch (site C). Mr. X requests the bank to remit a fixed amount of money to Mr. Y. Site B subtracts the amount from Mr. X's account in database B and sends the data processing request to add the amount to Mr. Y's account to site C. Site C adds the amount to Mr. Y's account in database C. In this example, when site B becomes the coordinator, site B sends the data processing request to site C. When site C receives the data processing request, site C becomes the participant. Then sites B and C execute the processing by using data in their respective databases. When sites B and C have finished executing the processing (processing end), they each store the data processing result in temporary storage, which is not a part of either database. Then, site C sends a processing end message (STE) to site B. When site B receives the processing end message (STE) from site C, site B prepares to commit process (PC). Thus, site B is prepared to write the data processing result from its temporary storage to its database. Then site B sends a commit preparation completion message (PCM) to site C. When site C receives the commit preparation message from the site B, site C also prepares to commit process (PC). Site C sends an acknowledgment message (ACK) to site B. When site B receives the acknowledgment message from site C, site B executes the commit process (CO). Thus, site B writes the data processing result from its temporary storage to database B. Then site B sends a commit completion message (COM) to site C. When site C receives the commit message from site B, site C also executes commit process (CO). Then site C sends an acknowledgment message (ACK) to site B. When site B receives the acknowledgment message, the transaction comprising the data processing, commit preparation process and commit process is completed. However, in this case, as shown in FIG. 1, it takes twenty seconds to a send message between sites B and C. Therefore, as shown in FIG. 2, it takes one hundred ten seconds to complete the transaction from processing end to transaction end.

Figure 3:
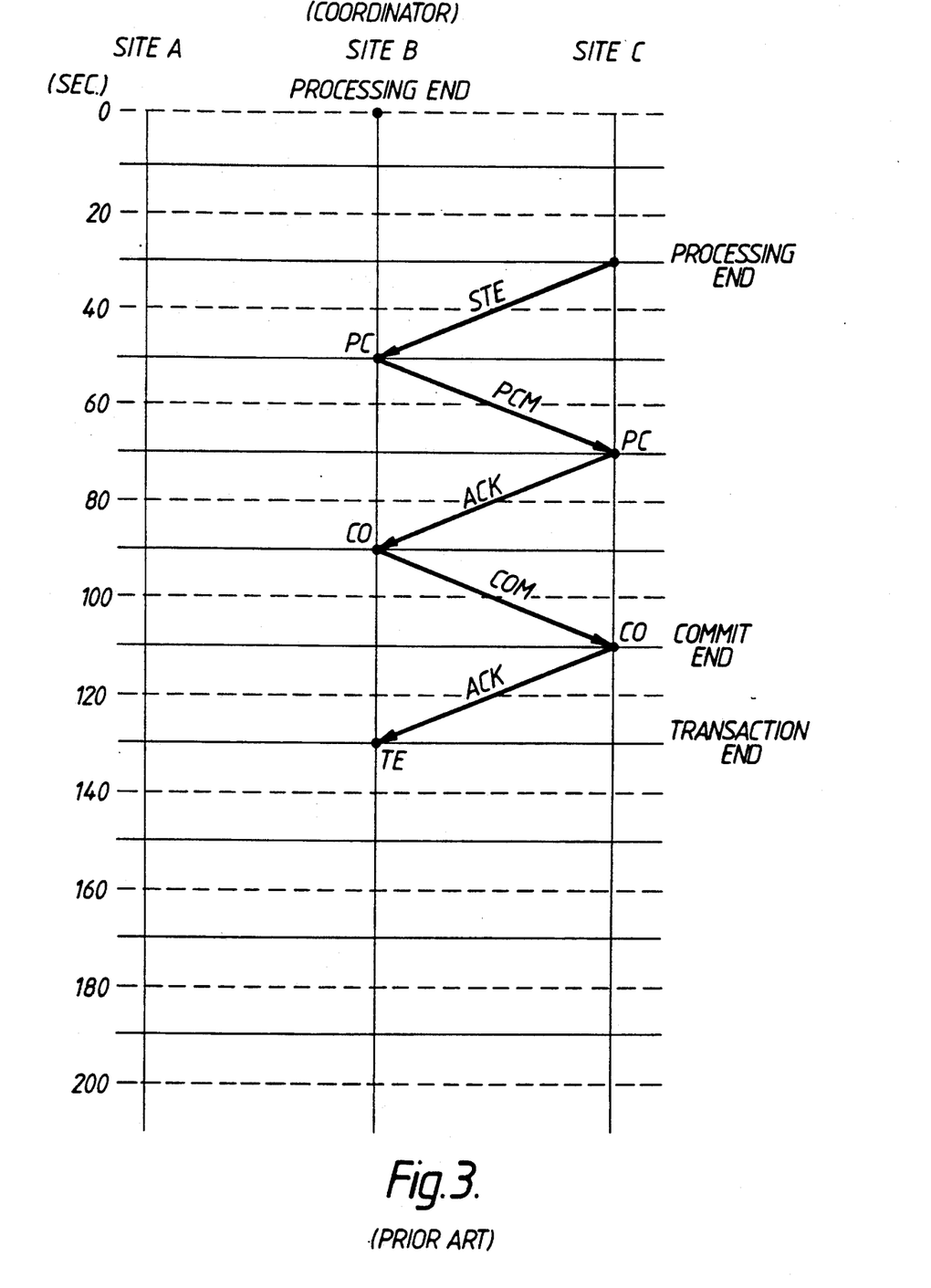
FIG. 3 is another time table of commit processing according to the prior art.

FIG. 3 shows another time table of commit process according to the prior art, in case the difference between the processing end time of site B (zero) and the processing end time of site C (thirty seconds) is large. In the same way as FIG. 2, it is necessary for sites B and C to send many messages (STE, PCM, ACK, COM) to each other. As shown in FIG. 3, it takes one hundred thirty seconds to complete the transaction from processing end to transaction end.

As mentioned above, according to the prior art, it takes a long time to a complete transaction between a plurality of sites.

Accordingly, it is an object of the present invention to reduce the time from processing end to transaction end in a distributed database system.

SUMMARY OF THE INVENTION

These and other objects of the present invention are accomplished by a distributed database apparatus comprising a plurality of sites respectively having a computer and a database; communication means for interconnecting the plurality of sites to communicate transactions between the sites; wherein the databases store data for processing. Each computer includes transaction generation means for generating a transaction; communication management means for managing communication through the communication means; transaction execution means for executing data processing of the transaction generated by the transaction generation means or communicated by another site through the communication management means, according to data stored in the database of the computer; list creation means for creating a list of sites which must participate in the transaction generated by the transaction generation means, the sites other than the transaction generation site being participation sites, and for sending the list to all participation sites through the communication management means; commit preparation process means for preparing for commit processing of the transaction when the transaction execution means finishes executing data processing of the transaction, and for sending a commit preparation completion message to all participation sites through the communication management means; and commit process means for executing commit processing of the transaction, when the communication management means receives commit preparation completion messages from all participation sites within a predetermined period after the commit preparation process means has sent the commit preparation completion message.

Preferably, the commit process means includes abort means for aborting the transaction when the transaction execution means fails to execute the data processing. It is also preferred that the abort means include means for generating an abort message and sending the abort message to all participation sites through the communication management means.

The commit process means also may include means for sending an acknowledgment message to all participation sites through the communication management means, after executing commit processing of the transaction.

BRIEF DESCRIPTION OF THE DRAWINGS

The accompanying drawings, which are incorporated in and constitute a part of the specification, illustrate the presently preferred embodiments of the invention, and together with the description, serve to explain the principles of the invention. Of the drawings.

DESCRIPTION OF THE PREFERRED EMBODIMENTS

Figure 4:
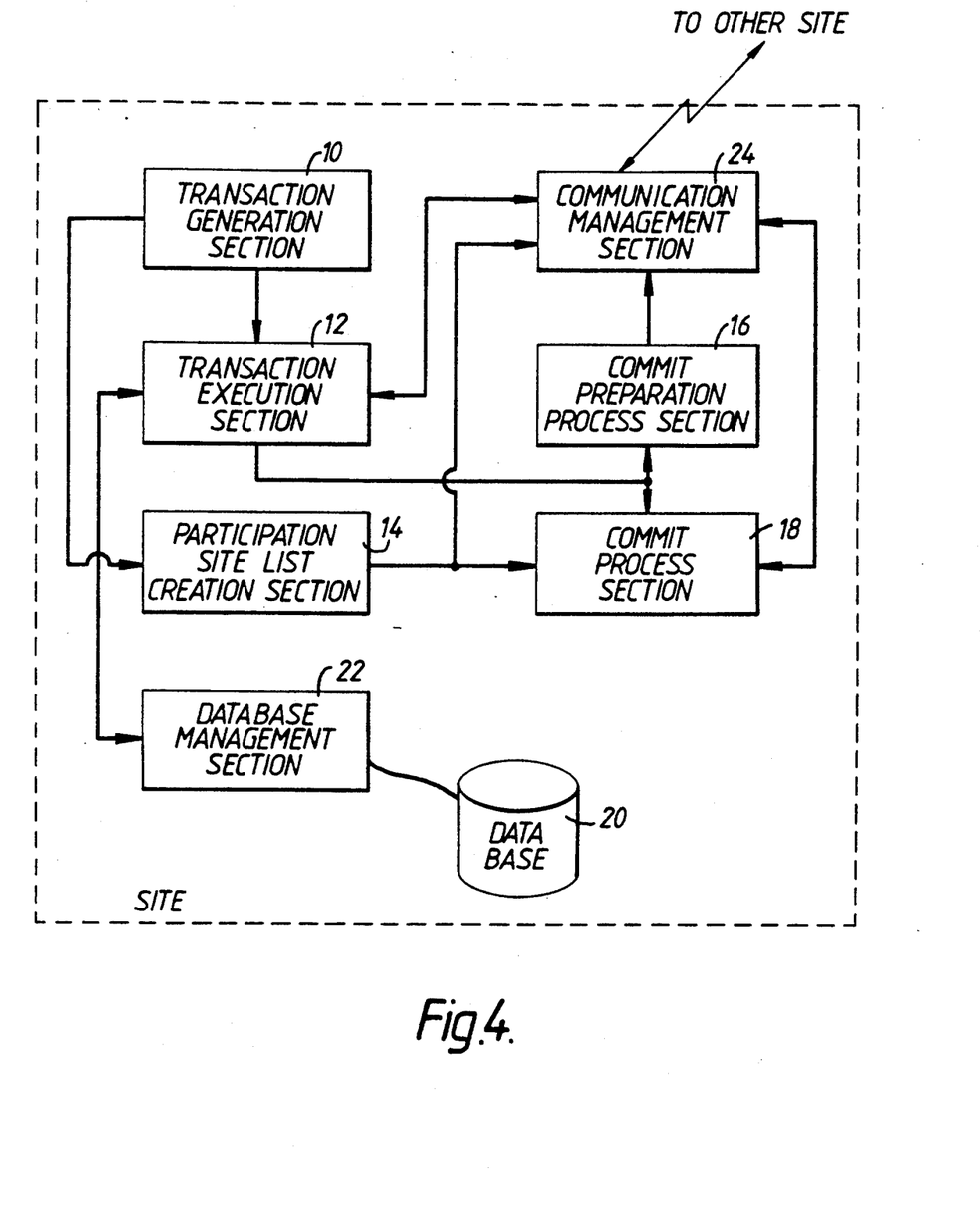
FIG. 4 is a block diagram of a site of the distributed database system according to the present invention.

Reference will now be made in detail to the present preferred embodiment of the invention, examples of which are illustrated in the accompanying drawings. FIG. 4 is a block diagram of a site of the distributed database system according to the present invention. In this initial site, transaction generation section 10 generates a transaction, according to a data processing request supplied by an input device (not shown). Transaction execution section 12 executes data processing of the transaction, which was generated by the transaction generation section 10 or sent by other site. Participation site list creation section 14 creates a list of sites which must participate in the transaction generated by the transaction generated section 10. The sites which participate in the transaction, except for the initial site, are called participation sites. When the transaction execution section 12 finishes executing the data processing, commit preparation process section 16 prepares for commit processing of the transaction and sends a commit preparation completion message to all participation sites. After the commit preparation process section 16 has sent the commit preparation complete message, commit process section 18 executes commit processing of the transaction if it has received a commit preparation completion message from all participation sites within a predetermined period. The commit process section 18 executes an abort processing of the transaction if it does not receive at least one commit preparation completion message from any of the participation sites within a predetermined period. Database 20 stores data to be read and written by the transaction execution section 12. Database management section 22 manages the database 20 to be read and written by the transaction execution section 12. Communication management section 24 manages communication to other sites through the communication lines.

Figure 5:
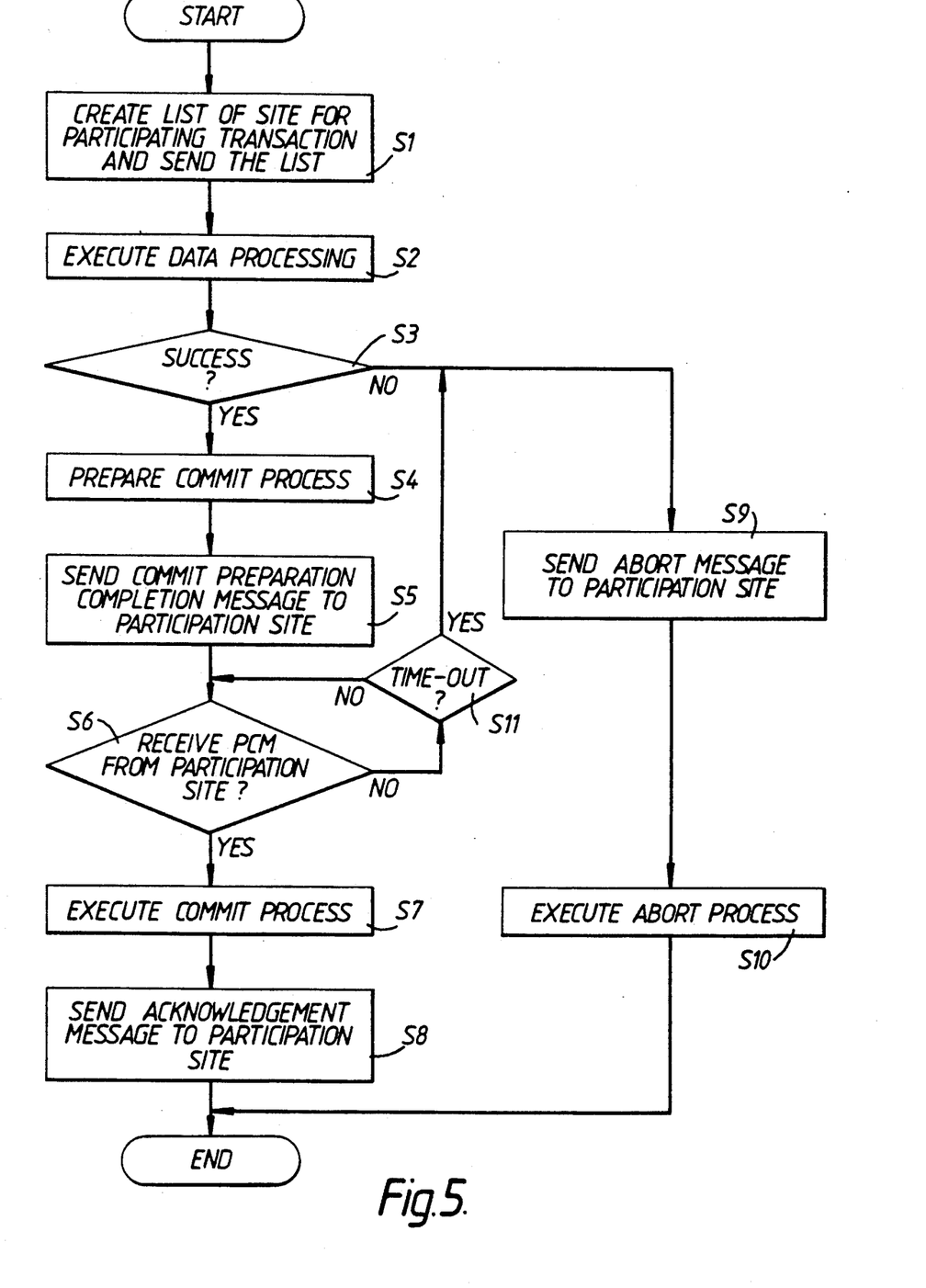
FIG. 5 is a flow chart of the site of the distributed database system according to the present invention.

FIG. 5 shows a flow chart of the site of the distributed database system according to the present invention. By using FIG. 5, the process of the site of the present invention is explained in detail. First, when the transaction generation section 10 generates a transaction, the site list creation section 14 enumerates all sites which must participate in executing the transaction, and creates a list of these sites. (For the above-mentioned example, when Mr. X requests to remit money to the Washington branch (site B), the Washington branch (site B) and the New York branch (site C) are enumerated.) Then the site list creation section 14 sends the list and transaction request to all participation sites which are enumerated in the list through the communication management section 24 (Sl in FIG. 5). Next, the transaction execution section 12 in the initial site which generated the transaction executes data processing of the transaction by using data stored in the database 20 (S2 in FIG. 5). At the same time, the transaction execution section 12 in each participation sites, which received the list and transaction request, executes data processing of the requested transaction. When the transaction execution section 12 succeeded in executing the data processing, the commit preparation process section 16 prepares for commit processing of the transaction (S3 and S4 in FIG. 5). The commit preparation process section 16 prepares to write the data processing result from temporary storage (not shown) to the database 20. At the same time, the commit preparation process section 16 sends a commit preparation completion message (PCM) to all participation sites (S5 in FIG. 5).

If the communication management section 24 receives commit preparation message from participation site through the communication lines within predetermined a period (S6 in FIG. 5), the commit process section 18 executes commit processing of the transaction (S7 in FIG. 5). During commit processing, the commit process section 18 writes the data processing result from temporary storage to the database 20. Then, the commit process section 18 sends an acknowledgment message (ACK) to all participation sites through the communication management section 24 (S8 in FIG. 5).

At S3 in FIG. 5, a determination is made whether the transaction execution section 12 failed to execute the data processing. For the above-mentioned example, site B subtracts the amount from Mr. X's account. However, if the balance becomes a negative value, site B cancels Mr. X's request and resist C must cancel the transaction requested by site B. In this case, the commit process section 18 sends an abort message to all participation sites through the communication management section 24 (S9 in FIG. 5). Then the commit process section 18 executes an abort process of the transaction (S10 in FIG. 5). The commit process section 18 abandons the data processing result in temporary storage. All participation sites which received the abort message also abandon the data processing result.

At S6 in FIG. 5, after the commit preparation process section 16 has sent the commit preparation completion message to all participation sites, the communication management Section 24 determines whether at least one commit preparation completion message from all participation sites to which the commit preparation process section 16 sent the commit preparation completion message, has been received within a predetermined period. This period is predetermined according to characteristics of the distributed database system. In the event at least one commit preparation message was not received, at least one participation site failed in executing the data processing. Accordingly, the commit process section 18 sends an abort message to all participation sites through the communication management section 24. Then all participation sites and the initial site execute an abort process.

Figure 6:
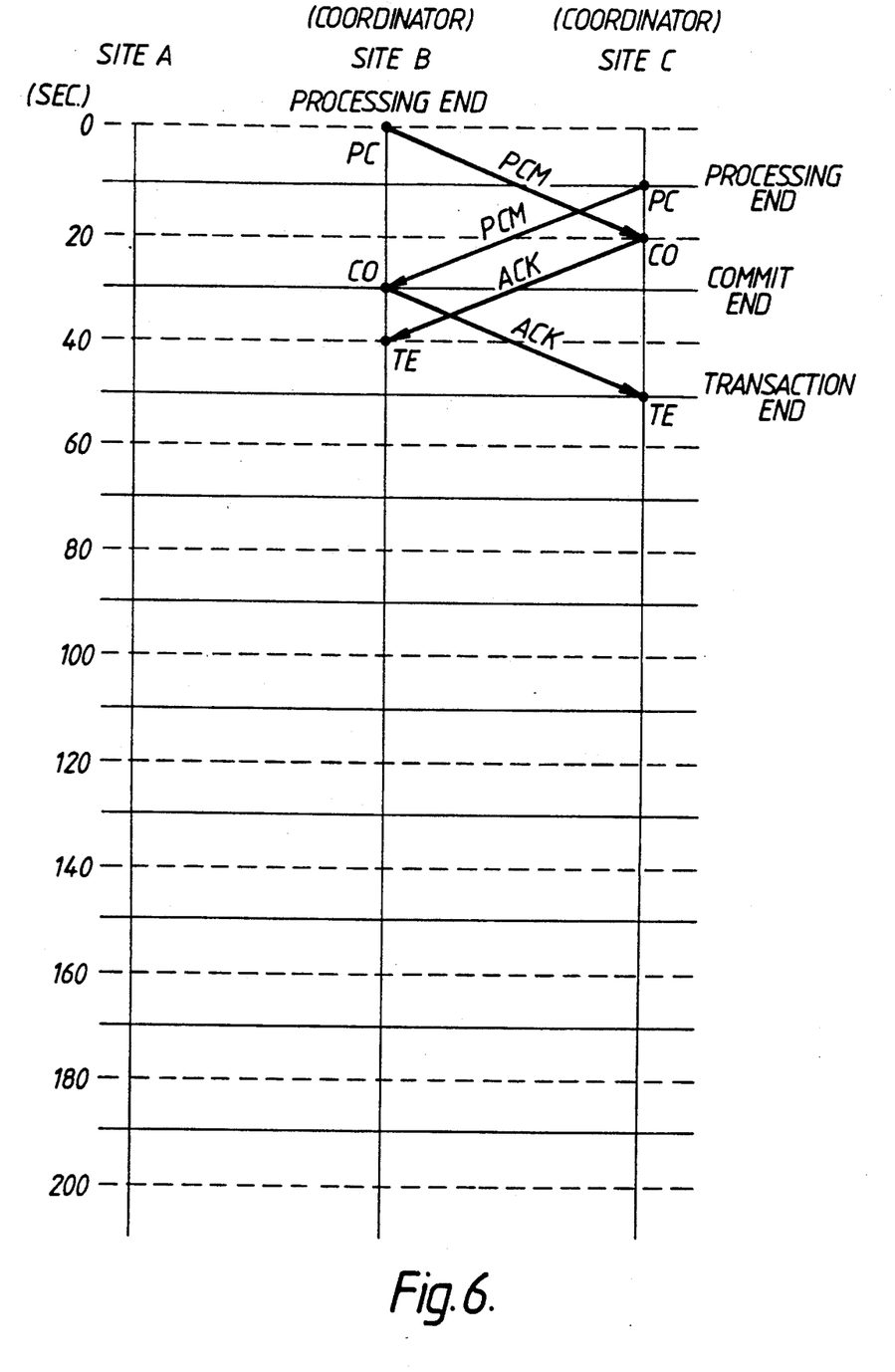
FIG. 6 is a time table of commit processing according to the present invention.

Next, the message communication situation of commit processing of the present invention is explained. FIG. 6 shows a time table of commit processing according to the present invention. In FIG. 6, as the above-mentioned example, it is assumed that a transaction is executed in both site B and site C. In this case, according to the present invention, both site B and site C become coordinators. In the prior art, a site, which is supplied with a transaction request by a user, becomes a coordinator. When site B and site C have finished executing data processing (processing end), they execute commit preparation processing (PC) immediately and send a commit preparation completion message (PCM) to each other. Then, site B waits for the PCM from site C. Site C waits for the PCM from site B. When site B receives the PCM from site C within predetermined period, site B executes commit processing (CO) immediately and sends an acknowledgment message (ACK) to site C. When site C receives the PCM from site B within the predetermined period, site C executes commit processing (CO) immediately and sends the ACK to site B. After that, when site B receives the ACK from site C and site C receives the ACK from site B, the transaction including commit processing is finished completely (TE).

In these ways, each site does not need to execute commit processing when it receives the ACK, which corresponds to a particular PCM, from another site. After executing the commit preparation process, when each site receives the PCM from all other participation sites, each site can execute commit processing immediately. Accordingly, it is not necessary for each site to wait until it receives ACK, which corresponds to a particular PCM, from each other. As a result, as shown in FIG. 6, it takes only fifty seconds from processing end time to transaction end time. In the prior art, as shown in FIG. 1, it takes one hundred ten seconds.

Figure 7:
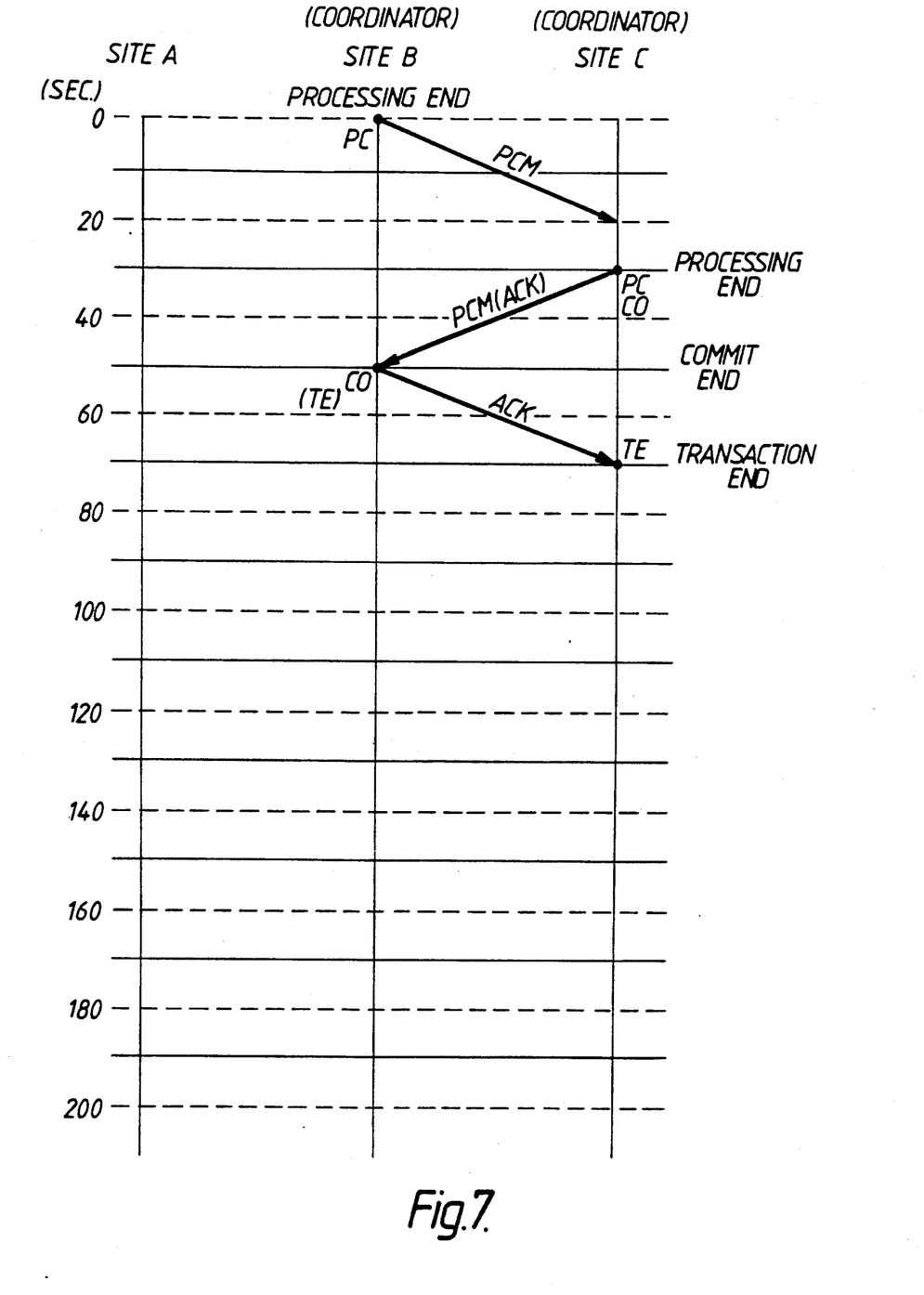
FIG. 7 is another time table of commit processing according to the present invention.

FIG. 7 shows another time table of commit processing according to the present invention. In FIG. 7, the difference the between processing end time of site B (0 sec.) and site C (30 sec.) is large. In this case, when site C finishes data processing after receiving a PCM from site B, site C executes commit preparation processing (PC) immediately. At the same time site C executes commit processing (CO). Then site C sends the PCM to site B. This PCM serves as a combined PCM and ACK, because site C executed both commit preparation processing and commit processing. When site B receives the combined PCM/ACK from site C, site B executes commit processing (CO) immediately and sends the ACK to site C. When site C receives the ACK from site B, the transaction including commit processing is finished completely (TE). In these ways, it takes only seventy seconds from processing end time to transaction end time. In the prior art, as shown in FIG. 2, it is necessary to send STE, PCM, ACK, COM signals between site B and site C. As a result, it takes one hundred thirty seconds to complete the transaction.

Additional advantages and modifications will readily occur to those skilled in the art. The invention in its broader aspects is therefore not limited to the specific details, representative apparatus and illustrative examples shown and described. Accordingly, departures may be made from such details without departing from the scope or spirit of the general inventive concept defined by the appended claims and their equivalents.

What is claimed is:

1. A distributed database system, comprising:
   a plurality of sites, each having a computer and a database;
   communication means for interconnecting the plurality of sites to receive a received transaction and transmit a transmitted transaction between the sites, wherein the site which transmits a transmitted transaction is a transaction generation site;
   wherein the databases store data for processing, and in at least one of the plurality of sites the computer includes:
   transaction generation means for generating a transaction;
   communication management means for managing communication through the communication means;
   transaction execution means for executing data processing of the transaction generated by the transaction generation means and the received transaction communicated by another site through the communication management means on the data stored in the database;
   list creation means for creating a list of sites, which must execute data processing in response to the transaction generated by the transaction generation means, the sites other than the transaction generation site being participation sites wherein at least one of said participation sites must forward a processing request to another one of said participation sites for the completion of the transaction and for sending the list of all participation sites through the communication management means wherein said list identifies said transaction generation site;
   commit preparation process means for commit preparation processing of the transaction when the transaction execution means finishes executing data processing of the transaction, and for directly sending a commit preparation completion message to said transaction generation site based upon said list through the communication management means; and commit process means for executing commit processing of the transaction, when the communication management means receives commit preparation completion messages, generated by each participation site when the participation site finishes its respective data processing of the transaction, from all participation sites within a predetermined period after the commit preparation process means has sent the commit preparation completion message.

2. The distributed database system according to claim 1, wherein the commit process means includes abort means for aborting the transaction when the transaction execution means fails to execute the data processing.

3. The distributed database system according to claim 2, wherein the abort means include means for generating an abort message and sending the abort message to all participation sites through the communication management means.

4. The distributed database system according to claim 1, wherein the commit process means includes means for sending as acknowledgement message to all participation sites through the communication management means, after executing commit processing of the transaction.

5. A distributed database system, comprising:
a plurality of sites, each having a computer and a database;
communication means for interconnecting the plurality of sites to receive a received transaction and transmit a transmitted transaction between the sites, wherein the site which transmits a transmitted transaction is a transaction generation site;
wherein the databases store data for processing, and in at least one of the plurality of sites the computer includes:
transaction generation means for generating a transaction;
communication management means for managing communication through the communication means;
transaction execution means for executing data processing of the transaction generated by the transaction generation means and the received transaction communicated by another site through and communication management means on the data stored in the database;
list creation means for creating a list of sites, which must execute data processing in response to the transaction generated by the transaction generation means, the sites other than the transaction generation site being participation sites wherein at least one of said participation sites must forward a processing request to another one of said participation sites for the completion of the transaction, and for sending the list to all participation sites through the communication management means wherein said list identifies said transaction generation site.
commit preparation process means for commit preparation processing of the transaction when the transaction execution means finishes executing data processing of the transaction, and for directly sending a commit preparation message to said transaction generation site based upon said list through the communication management means; and commit process means for executing commit processing of the transaction with no delay after preparation for commit processing by the commit preparation process means, if the communication management means receives the commit preparation completion messages, generated by each participation site when the participation site finishes its respective data processing of the transaction, from all participation sites before the transaction execution means finishes executing data processing of the transaction.

6. The distribution database system according to claim 5, wherein the commit process means includes means for sending an acknowledgement message combined with the commit preparation completion message sent by the commit preparation process means.

7. The distributed database system according to claim 6, wherein the commit process means includes means for executing commit processing of the transaction and finishing the transaction if the communication management means receives the acknowledgment message combined with the commit preparation completion message from all participation sites after preparation for commit processing by the commit preparation process means.

8. A distributed database system, comprising:
a plurality of sites, each having a computer and a database;
communication means for interconnecting the plurality of sites to receive a received transaction and transmit a transmitted transaction between the sites, wherein the site which transmits a transmitted transaction is a transaction generation site;
wherein the databases store data for processing, and in at least one of the plurality of sites the computer includes:
transaction generation means for generating a transaction;
communication management means for managing communication through the communication means;
transaction execution means for executing data processing of the transaction generated by the transaction generation means and the received transaction communicated by other site through the communication management means, on the data stored in the database;
list creation means for creating a list of sites which must execute data processing in response to the transaction generated by the transition generation means, the sites other than the transaction generation site being participation sites wherein at least one of said participation sites must forward a processing request to another one of said participation sites for the completion of the transaction and for sending the list to all participation site through the communication management means wherein said list identifies said transaction generation site;
commit preparation process means for commit preparation processing of the transaction when the transaction execution means finishes executing data processing of the transaction, and for directly sending a commit preparation completion message to said transaction generation site based upon said list through the communication management means; and commit process means for executing an abort processing of the transaction when the communication management means does not receive a commit preparation completion message, generated by each participation site when the participation site finishes its respective data processing of the transaction, from all participation sites within a predetermined period after the commit preparation process means has sent the commit preparation completion message.

9. The distributed database system according to claim 8, wherein the commit process means includes means for generating an abort message and sending the abort message to all participation sites through the communication management means.

* * * * *

UNITED STATES PATENT AND TRADEMARK OFFICE
CERTIFICATE OF CORRECTION

PATENT NO. : 5,291,594
DATED : March 01, 1994
INVENTOR(S) : Koichi Sekiguchi et al.

Page 1 of 2

It is certified that error appears in the above-indentified patent and that said Letters Patent is hereby corrected as shown below:

Claim 1, column 6, line 62, before "and" insert --,--.

Claim 4, column 7, line 26 change "as" to --an--.

Claim 5, column 7, line 50 change "and" to --the--.
 column 7, line 63 change "." to --;--;
 column 7, line 68 before "message" insert --completion--.

Claim 6, column 8, line 14 change "distribution" to --distributed--.

Claim 8, column 8, line 57 before "and" insert --,--;
 column 8, line 58 change "site" to --sites--.

UNITED STATES PATENT AND TRADEMARK OFFICE
CERTIFICATE OF CORRECTION

PATENT NO. : 5,291,594
DATED : March 1, 1994
INVENTOR(S) : Koichi Sekiguchi, et. al.

It is certified that error appears in the above-indentified patent and that said Letters Patent is hereby corrected as shown below:

Claim 8, column 8, line 57 before "and" insert --,--;
  column 8, line 58, change "site" to --sites--.

Signed and Sealed this

Seventh Day of March, 1995

Attest:

BRUCE LEHMAN

*Attesting Officer*   *Commissioner of Patents and Trademarks*